United States Patent [19]

Stannow et al.

[11] Patent Number: 4,893,007

[45] Date of Patent: Jan. 9, 1990

[54] ROTARY MACHINE WITH A MEASURING DEVICE FOR THE ANGLE OF ROTATION

[75] Inventors: Jorgen C. Stannow, Sonderborg; Bruno Wolff, Malov; Niels H. Gade, Sonderborg; Ib M. Espensen; Knud Blohm, both of Nordborg, all of Denmark

[73] Assignee: Danfoss A/S, Nordborg, Denmark

[21] Appl. No.: 188,213

[22] Filed: Apr. 29, 1988

[30] Foreign Application Priority Data

May 16, 1987 [DE] Fed. Rep. of Germany ....... 3716464

[51] Int. Cl.$^4$ ............................................. G01D 5/34
[52] U.S. Cl. ........................... 250/231 SE; 250/237 G
[58] Field of Search ................... 250/231 SE, 237 G; 341/13, 15, 16

[56] References Cited

U.S. PATENT DOCUMENTS

| | | | |
|---|---|---|---|
| 4,639,595 | 1/1987 | Okita et al. | 250/231 SE |
| 4,641,027 | 2/1987 | Renner et al. | 250/231 SE |
| 4,713,539 | 12/1987 | Hackman | 250/231 G |
| 4,724,317 | 2/1988 | Brown et al. | 250/231 SE |
| 4,740,689 | 4/1988 | Swiden | 250/231 SE |

Primary Examiner—David C. Nelms
Attorney, Agent, or Firm—Wayne B. Easton; Clayton R. Johnson

[57] ABSTRACT

The invention relates to a device or arrangement for measuring the angle of rotation of the rotor of a rotary machine. Markings are applied circumferentially to a part of the rotor that is enclosed by the housing and a passage is provided in the housing which has an opening adjacent the markings. A sensor arrangement disposed at least partly in the housing passage has one end thereof adjacent the markings in a position for detecting the rotational movement of the markings. The snesor arrangement may have electrical, magnetic or optical capabilities.

9 Claims, 3 Drawing Sheets

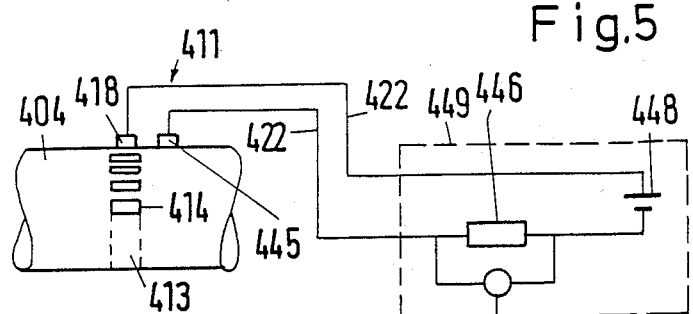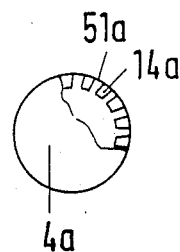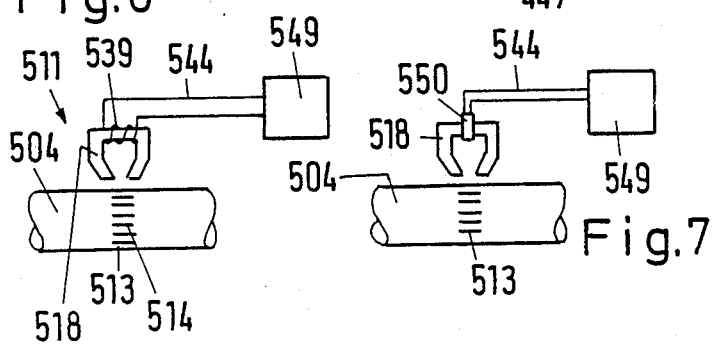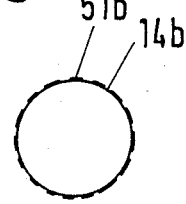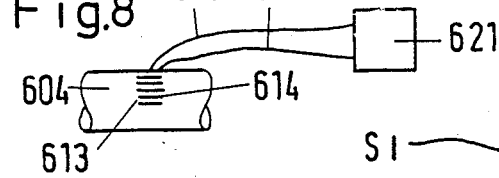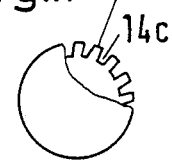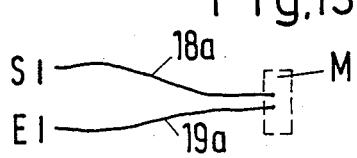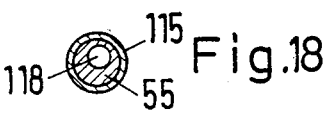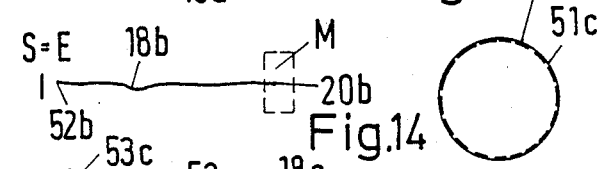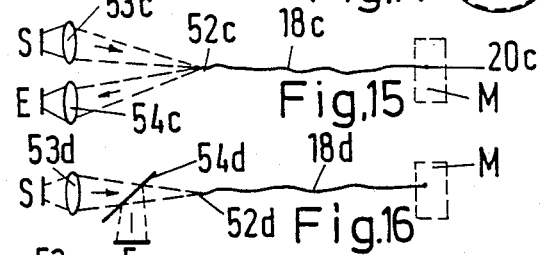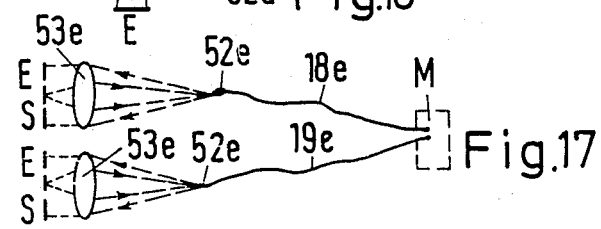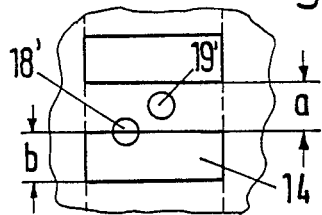

ROTARY MACHINE WITH A MEASURING DEVICE FOR THE ANGLE OF ROTATION

The invention relates to a rotary machine with a measuring device for the angle of rotation that comprises a rotatable carrier with at least one circumferential train of marking elements and a stationary signalling device with a scanning element associated with the train.

Such a rotary machine is known from DE-PS No. 31 11 112 which corresponds to U.S. Pat. No. 4,426,856. A drive motor drives a main shaft to which a disc is coupled that is provided with markings at the end. This disc together with an opto-electrical converter forms a measuring device for the angle of rotation. Each line of the markings corresponds to an increment in the angle. By counting the scanned markings, one can determine the angle of rotation travelled and from this the rotary speed, the angular speed and other parameters depending thereon.

Such a measuring device represents an additional component which takes up room and involves costs. Small devices also have the disadvantage of a low accuracy, whether they start to oscillate by reason of a reduced stability or whether the capacity of resolution is reduced for a smaller disc.

The invention is based on the problem of providing a rotary machine with a measuring device for the angle of rotation that takes up little room and calls for low additional costs and facilitates more accurate measurements.

This problem is solved according to the invention in that the carrier is formed by a rotary part of the machine and the scanning element is carried by the housing of the machine.

In this construction, a special carrier is dispensed with. It is merely necessary to apply marking elements to the rotary part. This represents a saving in space and costs. Rotary machines are built with a high degree of stability to avoid undesirable oscillations. Consequently, the relationship between the scanning element carried by the housing and the train applied to the rotary part is maintained. This leads to measurements of high accuracy. It is therefore possible to accommodate a larger number of marking elements in the train and thereby obtain higher accuracy in the measurement of the angle. If one selects a rotary part of large diameter, one can in any case accommodate a larger number of marking elements than hitherto.

It is particularly favourable to apply the train to the outer circumferential surface or to the end face of the rotary part. As a rule, one can then secure the scanning element directly in the housing. However, there are also other points of application, for example the internal circumference of a sleeve.

In a preferred example, the carrier is formed by a rotary part supported by a bearing fixed with respect to the housing and the train and scanning element are disposed in the vicinity of the bearing. In the region of the bearing, that is to say in the bearing or near it, the rotary part has an accurately predetermined position with reference to the housing. In this position, the scanning element retains its position relatively to the bearing with high precision.

If the rotary part is supported by two adjacent radial roller bearings, the train and scanning element can be disposed between the roller bearings. In an alternative construction, the rotary part is supported by a slide bearing and the train and scanning element are disposed in the slide face. This gives the highest possible precision between the scanning element and train. One therefore obtains very accurate measuring results.

It is also favourable to provide a forced fluid flow and for the train to be disposed in the path of the fluid. The fluid ensures that no dirt can collect on the train and scanning element, that no oxidation takes place, and the like. The originally achieved measuring signals are therefore maintained throughout the life of the device. A suitable fluid can be lubricating oil. An application that is particularly recommended is for a rotary machine which is operated with pressure fluid. Such hydraulic motors or pumps have a high fluid throughput which will be sure to keep the point of measurement clean.

A particularly good resolution is obtained if the scanning element is directly adjacent to the train, i.e., makes contact with it. This results in gap widths corresponding to a conventional clearance or slide fit. One can achieve signals with steep flanks, which permits a high resolution and accuracy. Dirt deposits in front of the scanning element are practically eliminated. Damping through oil or other intermediate materials is at a minimum.

Further, the carrier should have a throughgoing planar or cylindrical surface in the region of the train. The markings are therefore not represented by depressions but rather filled depressions or simply alterations in the surface of the carrier. In this way, the gap between the scanning element and carrier is constant, which again reduces the danger of soiling.

There are various possibilities for the embodiment of the train. Thus, the train may be formed by sections of different electric conductivity and the scanning element by an electrically conductive contact member. The train can also be formed by sections of different magnetic conductivity and the scanning element by the core of an electromagnet.

It is particularly favourable for the train to be formed by sections of different optical behaviour and the scanning element by a light conductor arrangement for leading primary light radiation from a transmitter to the train and reflected secondary light radiation from there to a receiver. With the aid of the light conductor arrangement, the primary light radiation can be led directly up to the train and the secondary light radiation can be derived from the direct vicinity of the point of reflection. The transmitter and receiver can be disposed at a spacing from the rotatable carrier, particularly on the outside of the housing or even next to the rotary machine. As is conventional, the transmitter and receiver need not operate with visible light; invisible light such a ultraviolet or infra-red radiation can be employed. Suitable light conductors are the known flexible optical fibres. However, glass rods and the like can also be employed.

More particularly, the light conductor arrangement may comprise a first light conductor for supplying the primary light radiation and a second light conductor for leading the secondary light radiation away. However, of particular advantage is a light conductor which transmits the primary as well as the secondary light radiation. In this case, the active scanning end is restricted to the cross-section of this light conductor and very accurate measurements are obtained with steep flanks for the signals.

A combined transmitter and receiver apparatus such as a known laser device can be associated with the end of the light conductor that is remote form the scanning end.

Alternatively, an optical device for separating the secondary and primary light radiations are associated with that end of the light conductor that is remote from the scanning end.

In a further development, the light conductor arrangement should be fixed in a tube at least at the scanning end. This not only gives protection for the light conductors but also ensures that the scanning end has a defined position in the installed condition.

Advantageously, the tube is flexible together with the light conductor arrangement. One can therefore, for example, bring the tube into position through a bore in the housing and then bend it to an angle in order to instal the light conductor at a surface of the housing or in a groove of the housing.

In a preferred embodiment, for the purpose of forming quadrature signals, the marking elements are spaced from each other by their width and two scanning elements have a centre-to-centre spacing of half the width in the direction of rotation. In this way, one obtains two signals electrically displaced in their phase by 90°. These signals can be utilised in known manner to derive not only parameters which depend on the angle of rotation, for example, rotary velocity, revolutions per minute and the like, but also the direction of rotation.

In particular, the two scanning elements can each be formed by a light conductor which are disposed in a common tube. The two light conductors are so closely juxtaposed that a single train will suffice. The installation is thereby very simple. Since the scanning ends are fixed in the tube, they can be introduced at the required centre-to-centre spacing.

If this requires too large a spacing during manufacture, one can also make provision for the scanning ends of the light conductors to have absolutely a larger centre-to-centre spacing than the width of the marking elements and for the tube to be rotatable in the housing for the purpose of adjustment. By deliberately selecting a larger centre-to-centre spacing, the mechanic will after assembly be free to carry out precise adjustment electrically to a phase displacement of 90° by turning the tube.

Examples of the invention will now be described in more detail with reference to the drawings, wherein:

FIGS. 1, 2, 3 and 4 are partial longitudinal sections of different rotary machines having differently applied and constructed measuring devices for the angle of rotation;

FIGS. 5, 6, 7 and 8 and diagrammatic representations of different types of measuring devices for the angle of rotation;

FIGS. 9, 10, 11 and 12 show different types of train markings;

FIGS. 13, 14, 15, 16 and 17 are diagrammatic representations of different optoelectrical angle measuring devices with light conductors;

FIGS. 18, 19 and 20 are cross-sections through different embodiments of tubes containing light conductors; and FIG. 21 is a plan view of the train with the scanning ends of two light conductors.

Figure 1:
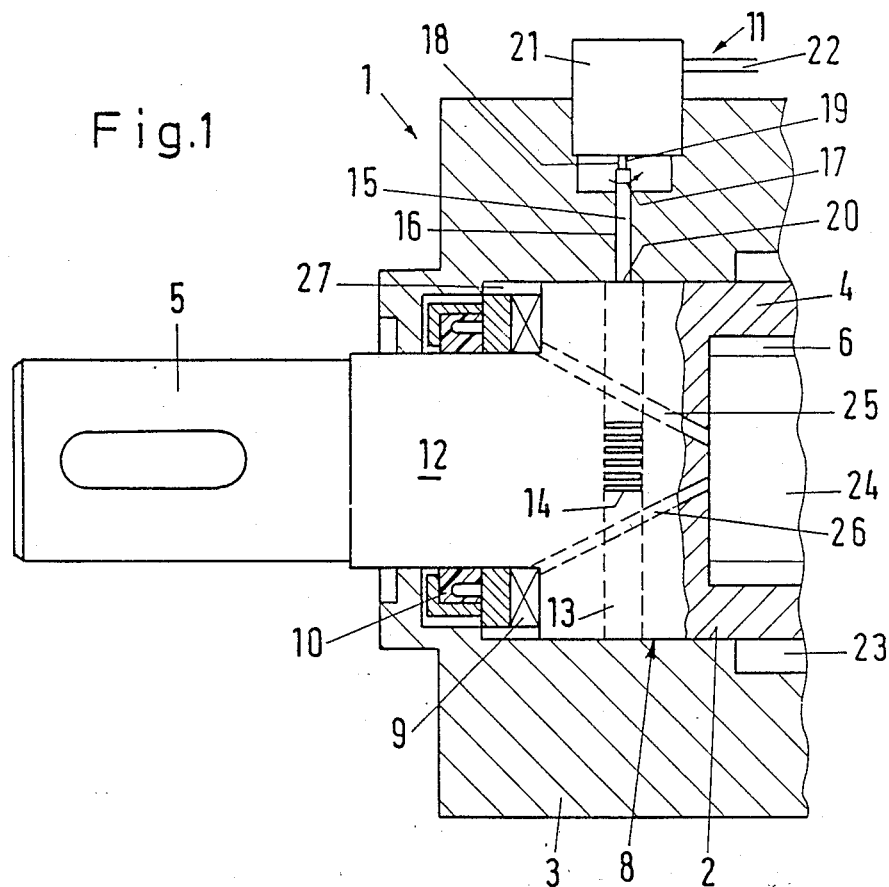

FIG. 1 illustrates part of a rotary machine 1 in the form of an internally shafted hydraulic planetary piston machine, particularly a motor, such as known from DE-PS No. 29 10 831. A rotary slide 4 is slidingly mounted in the bore 2 of a housing 3. The rotary slide is on the one hand connected to a main shaft 5 and on the other hand it is coupled by way of toothing 6 to a cardan shaft which constitutes a drive connection to the planetary piston. With the aid of control orifices in the rotary slide 4 and in the bore 2 of the housing, the enlarging and reducing compressor chambers of the motor are filled and emptied in the correct sense. Together with the bore 2 of the housing, the rotary slide 4 forms a slide 8. At the end, the rotary slide 4 is supported by an axial roller bearing 9 and sealed by means of a ring seal 10.

A measuring device 11 for the angle of rotation is formed in that the surface 12 of the rotary slide 4 carries a train or track 13 of spaced marking elements 14. A tube 15 is clamped into a bore 16 of the housing but, as is indicated by the arrow 17, it is rotatable. In the tube 15 there are two light conductors 18 and 19 (see FIG. 20) of which the scanning ends 20 are directly adjacent to the train 13. The light conductors are connected to a signalling device 21 which comprises a transmitter, a receiver and possibly an optical device and which is supplied on the one hand with energy by way of a cable 22 and on the other hand transmits rotary angle signals which are derived from the different reflecting behaviour of the surface 12 and marking 14.

The scanning ends 20 therefore face the train 13 at a minimum spacing, i.e., within the frame of the slide bearing 8, so that very accurate measurements are produced. Grooves 23 in the housing 3 are for pressured fluid. The interior 24 of the rotary slide 4 is connected to the low pressure side; it communicates with the roller bearing chamber 27 by way of passages 25 and 26. One therefore obtains a flow of lubricating fluid from the control grooves 23 along the slide bearing 8 into the roller bearing chamber 27 and then on through the passages 25 and 26 into the interior 24. The accumulation of dirt in front of the scanning elements is therefore impossible.

Figure 2:
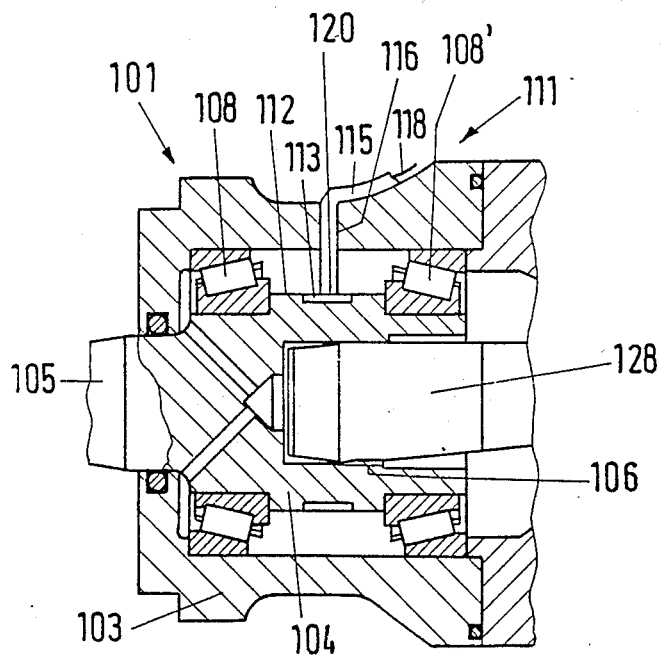

FIG. 2 illustrates a modified embodiment of a rotary machine in which corresponding integers are given reference numerals increased by 100. The main shaft 105 of the rotary machine 101 comprises a bearing sleeve 104 which is supported in the housing 103 by two roller bearings 108, 108'. A cardan shaft 128 leading to a rotary piston is coupled to the main shaft 105 by the internal teeth 106. Such a machine corresponds to DE-PS No. 19 31 144. In this case, the surface of the bearing sleeve 104 forms a carrier 112 for a train 113. The scanning element is again a light conductor 118 in a tube 115 of which the scanning end 120 is adjacent to the train 113. The tube 115 with light conductor 118 is pushed through a bore 116 in the housing and is bent through 90° at the outside so as to be led along the surface of the housing to a transmitting and receiver unit (not shown).

Figure 3:
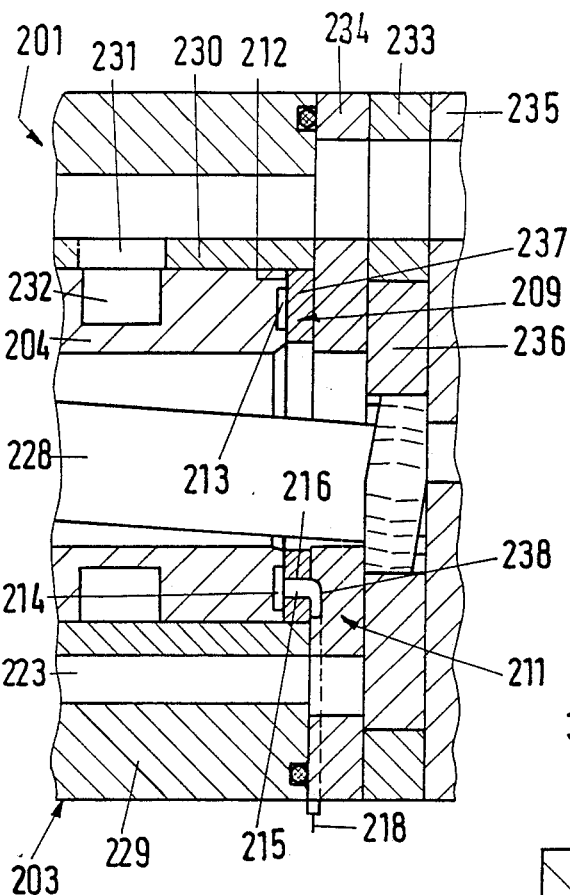

FIG. 3 shows a modified embodiment which again corresponds to DE-PS No. 29 10 831. Reference numerals are employed which are increased by 200 compared with FIG. 1. The housing 203 consists of a cylinder 229 which is provided with control grooves 223 and has a sleeve-like insert 230 with control orifices 231. The latter co-operate with control orifices 232 in the rotary slide 204. The housing 203 also has a plate-shaped stator 233 in the form of an internally toothed gear covered at both sides by a plate 234 and 235. A cardan shaft 228 is fixed to rotate with an externally toothed gear ring 236 which serves as a rotary piston. These housing components are held together by screws (not shown). The rotary slide 204 is supported at the end by a fixed slide ring 237. The associated end 212 of the rotary slide 204 serves as a carrier for a train or track 213 of marking elements 214. A tube 215 with a light conductor 218 is inserted in a bore 216 of the slide plate 237. The tube and light conductor are subsequently bent through 90° so that they can be led out in a groove 238 of the plate 234. To avoid the danger of breaking the light conductor, a larger bending radius can be chosen or, instead of bending, an optical arrangement may be employed to deflect the rays.

Figure 4:
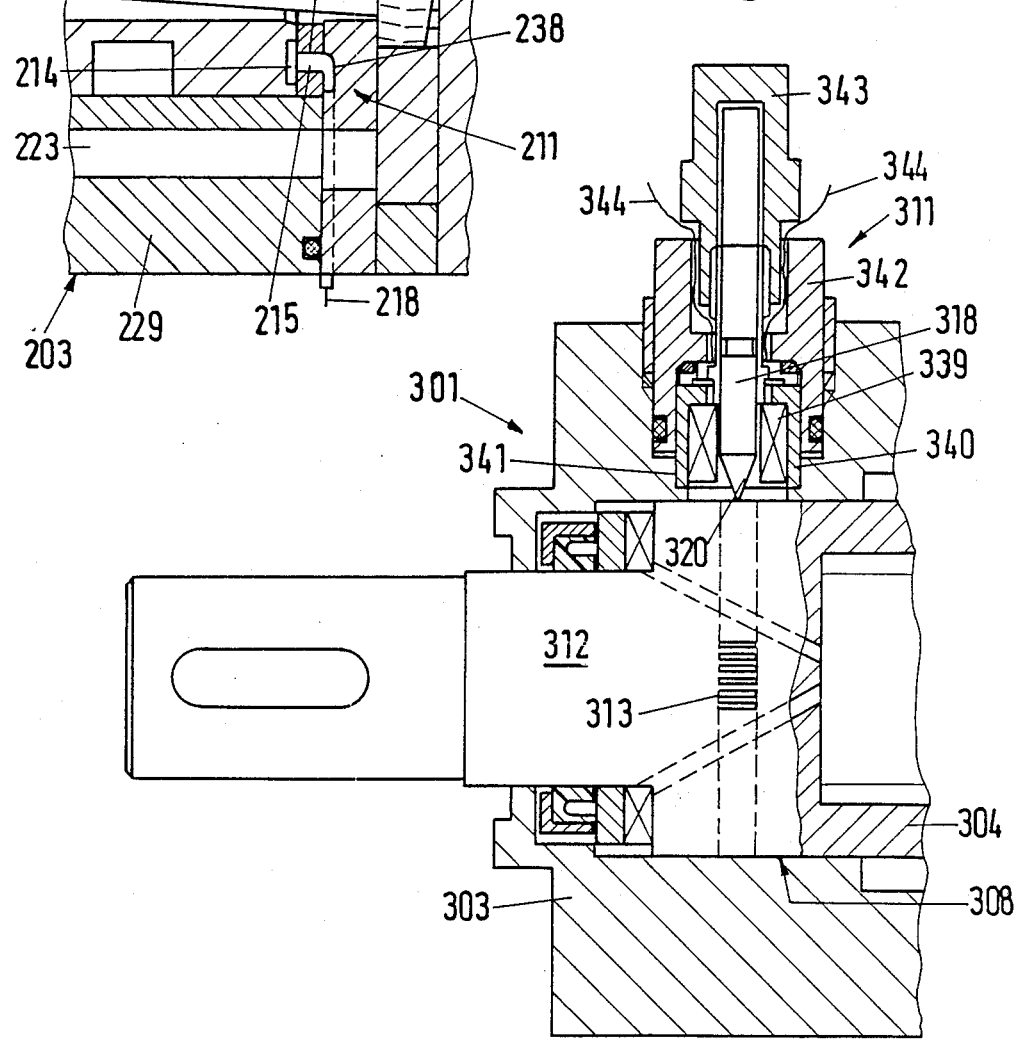

The rotary machine 301 of FIG. 4 corresponds in construction to that of FIG. 1. Corresponding integers are therefore provided with reference numerals increased by 300. It is only the measuring device 311 for the angle of rotation that is differently constructed. In this case, the train 313 co-operates with the scanning end 320 of a scanning element 318 in the form of the central core of an electromagnet 339 of which the pot-shaped external wall 340 is inserted in a complementary bore 341 of the housing 303. The whole is held in place by means of a screw insert 342. The position of the core 318 is radially adjustable with respect to the axis of the machine by means of a screw element 343. The associated conductors 344 are connected to a voltage source which is preferably AC. Changes in the current indicate whether or not the scanning end 320 is opposite a marking.

In FIG. 5, the measuring device 411 for the angle of rotation comprises a rotary member 404 with a train 413 of marking elements 414 having a different electric conductivity from the material of the rotary member itself. The scanning element 418 is an electrically conductive contact member. Next to it, there is a further contact member 445. Connecting lines 422 are connected directly or by way of a resistor 445 bridged by a volt meter 447 to a voltage source 448. The signalling device 449 thus formed serves for evaluation because the different conductivity of the markings 414 gives rise to different currents and therefore different voltage drops at the resistor 446.

In the embodiment of FIG. 6, the rotary member 504 is provided with a train 513 of marking elements 514 of different magnetic conductivity. The measuring device 511 for the angle of rotation includes a scanning element 518 in the form of a U-shaped magnetic core. Its winding 539 is connected to a signalling device 549 by way of conductors 544. The signalling device again contains a voltage source and a measuring circuit responsive to changes in the current. This circuit can be operated with DC but is preferably energised with AC because one can then work independently of the rotary speed of the rotary member 504. The modification of FIG. 7 corresponds to FIG. 6 with the difference that the magnetic core 518 is provided with a Hall generator 550 of which the voltage applied to the signalling device 549 by way of the conductors 544 vary with changes in the magnetic path.

In FIG. 8, a rotary member 604 is provided with a train 613 of marking elements 614 having different reflection properties compared with visible or invisible light. The scanning elements 618 and 619 are again two light conductors which are in communication with a transmitter and receiver unit 621. In this case, primary light radiation is fed by the transmitter by way of the light conductor 618 and reflected secondary light radiation is returned to the receiver by way of the light conductor 619.

In the embodiment of FIG. 9, the rotary member 4a of metal such as iron is provided with marking elements 14a in the form of grooves which are filled with an electrically non-conductive material. In contrast, the remaining intermediate spaces 51a are electrically conductive.

In FIG. 10, the same effect is achieved in that the marking elements 14b use a coating of electrically non-conductive material such as polytetrafluoroethylene. Spaces 51b remaining therebetween are provided with a metal surface, particularly iron.

In FIG. 11, the markings 14c are air-filled grooves with teeth 51c of iron therebetween.

In the embodiment of FIG. 12, the markings 14d are formed by darkcoloured surface strips whereas the intermediate spaces 51 retain a lighter surface.

The embodiments of FIG. 9 and 10 are particularly suitable for the mechanical electrical scanning of FIG. 5, the FIG. 11 embodiment for the magnetic inductive scanning of FIGS. 6 and 7 and the FIG. 12 embodiment for the electro-optical scanning of FIG. 8. However, filled grooves according to FIG. 9 could be used for the magnetic inductive scanning whereas the open grooves of FIG. 11 are also suitable for the electro-optical scanning.

FIG. 13 shows how a transmitter S directs primary light radiation onto a target area M by way of a light conductor 18a. The reflected secondary radiation is passed back to a receiver E by way of a second light conductor 19a. This can be the circuitry of FIG. 1.

It is particularly advantageous to use a single light conductor 18b for the primary and secondary radiation. Examples of this are shown in FIGS. 14 to 17.

In the embodiment of FIG. 14, a combined transmitter and receiver devices S=E is provided at the end 52b of the light conductor 18b that is remote from the scanning end 20b.

In FIG. 15, there is a light conductor 18c of which the end 52c opposite the scanning end 20c is provided with primary light radiation by way of a first lens 53c whereas secondary light radiation is passed to the receiver from this end 52c with the aid of a second lens 54c.

Much the same can be achieved with the arrangement according to FIG. 16 where the end 52d of the light conductor 18d is supplied with primary light radiation by way of a lens 53d whereas a translucent mirror 54d directs secondary light radiation on to the receiver E.

In FIG. 17, two light conductors 18e and 19e are provided which, together with a circular transmitter S, an annular receiver E surrounding same and a lens 53e or 53'e, each form an independent system. The lenses are so designed that the primary light radiation is again focussed at the end 52e or 52'e and the secondary radiation emanating therefrom strikes the receiver. This construction can likewise be embodied in FIG. 1.

According to FIG. 18, a single light conductor 118 is disposed in a metal tube such as of steel with an interpositioned filling mass 55. This tube can be bent together with the light conductor. It is polished to an optical quality at the ends. The tube can also be made of glass or ceramics. The light conductor may be centrally arranged but need not be.

In FIG. 19, two light conductors 19 are disposed in the tube 15. The centre-to-centre spacing is equal to half the width of a marking element 14 which, in turn, is equal to the spacing between adjacent marking elements. If one turns the tube 15 so that the light conductors 18, 19 are aligned in the direction of rotation, one obtains from the same train 13 two signals which are phase-displaced by 90 electric degrees and from which one can also determine the direction of rotation.

As is shown in FIG. 20, the light conductors 18' and 19' need not have the stated centre-to-centre spacing in the tube 15'. Instead, by suitably turning the tube 15' in the housing bore 16, one can ensure that the component of the centre-to-centre spacing in the direction of rotation is equal to half the width b of a marking element 14 or half the spacing a between the marking elements 14, as is shown in FIG. 21. An accurate spacing between the two light conductors 18' and 19' is not critical.

By installing the measuring device in the rotary machine, one obtains a simply constructed compact and robust construction. By reason of the disposition in the region of the bearing, practically no errors can be caused by a relative radial displacement. When one scans a rotary part of the machine, particularly a rotary part connected directly to the motor shaft, one also avoids or minimises relative displacement in the direction of rotation. The rotary part itself retains its shape well and this is another reason why there are small tolerances.

Because the scanning element practically touches the train and the surface of the scanning end of the light conductor is comparatively small, one obtains very accurate signals with steep flanks and therefore good resolution even in the case of narrow marking elements. Since there is no interfering intermediate layer in front of the scanning surface, damping of the light radiation caused by oil or other materials is negligible. The ratio of interference to the useful signal is therefore small.

The glass conductors are conventional components having a core of a glass thread or a glass fibre as well as a sleeve of a material with a low refraction coefficient.

The transmitter S may be a light diode or a semiconductor laser. Generally, the receiver E is a photodetector. A combined transmitter and receiver device can be formed by a semiconductor-laser.

The marking elements are represented as narrow rectangles. However, they may have a different shape, e.g., punctiform.

We claim:
1. A rotary machine having an angle of rotation measuring capability, comprising a machine housing having a housing bore, a machine rotor within the housing bore and rotor mounting means mounted within the machine housing for rotatably mounting the rotor, said rotor having circumferentially spaced markings thereon and within the machine housing and scanner means for sensing the markings for determining the angle of rotation, the scanner means including a sensor element mounted by the machine housing and extending into the housing bore into closely adjacent relationship to the markings.

2. A rotary machine according to claim 1 wherein said rotor has an outer circumferential surface portion having the markings thereon.

3. A rotary machine accoring to claim 1 wherein said rotor has a radial surface portion that has the markings thereon.

4. A rotary machine according to claim 1 wherein the rotor mounting means comprises axially spaced first and second bearings mounted by the machine housing in the housing bore and the markings are axially between the first and second bearings.

5. A rotary machine according to claim 1 wherein the rotor mounting means comprises slide bearings and the rotor comprises a shaft driven rotor slide mounted by the bearings and having the markings thereon.

6. A rotary machine according to claim 1 wherein there is provided means for forcing fluid flow in the housing bore past the markings.

7. A rotary machine according to claim 1 wherein the markings are circumferentially spaced from one another by a distance equal to the width of the markings and the scanner means includes a second sensor element, the sensor elements having center to spacing in the direction of rotation by half of the width.

8. A rotary machine according to claim 7 wherein the scanner means comprises a tube having the first and second sensor element therein.

9. A rotary machine according to claim 8 wherein the sensor elements have scanning ends that have a center to center spacing greater than the width of the markings and the tube is rotatably adjustably mounted by the housing.

* * * * *